US008374073B2

(12) United States Patent
Li et al.

(10) Patent No.: US 8,374,073 B2
(45) Date of Patent: Feb. 12, 2013

(54) DATA MODULATION IN A COMMUNICATION SYSTEM

(75) Inventors: Zhenhong Li, Shanghai (CN); Kari Pekka Pajukoski, Oulu (FI); Esa Tapani Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 453 days.

(21) Appl. No.: 12/451,205

(22) PCT Filed: Apr. 22, 2008

(86) PCT No.: PCT/EP2008/054860
§ 371 (c)(1),
(2), (4) Date: Feb. 26, 2010

(87) PCT Pub. No.: WO2008/132098
PCT Pub. Date: Nov. 6, 2008

(65) Prior Publication Data
US 2010/0189051 A1    Jul. 29, 2010

(30) Foreign Application Priority Data
Apr. 30, 2007   (GB) .................. 0708344.7

(51) Int. Cl.
*H04J 11/00*   (2006.01)
*H04W 4/00*   (2009.01)
*H04L 25/03*   (2006.01)

(52) U.S. Cl. ........ 370/207; 370/329; 370/535; 375/298; 332/102

(58) Field of Classification Search ........................ None
See application file for complete search history.

(56) References Cited

U.S. PATENT DOCUMENTS

| 7,903,628 B2* | 3/2011 | Akkarakaran et al. ........ 370/344 |
| 2002/0141436 A1 | 10/2002 | Toskala |
| 2007/0097942 A1* | 5/2007 | Gorokhov et al. ............ 370/342 |
| 2008/0151989 A1* | 6/2008 | Von Elbwart et al. ........ 375/239 |
| 2008/0205451 A1* | 8/2008 | Ramesh et al. ................ 370/491 |

FOREIGN PATENT DOCUMENTS

| EP | 1560359 A | 8/2005 |
| EP | 1898583 A1 | 3/2008 |
| JP | 2007-6014 | 1/2007 |
| RU | 2124812 | 1/1999 |
| WO | 2006/030491 A1 | 3/2006 |

OTHER PUBLICATIONS

Nokia: "TDM based Multiplexing Schemes between L1/L2 Control and UL data" 3GPP TSG RAN WG1 #46BIS, Seoul, Korea, vol. R1-62840, Oct. 9, 2006' pp. 1-4, XP003022050 Sections 1-4 1 figures 1,2.
Ericsson "Uplink Non-data-associated Control Signaling" TSG-RAN WG1 LTE ADHOC Cannes, France vol. R1-061862 Jun. 27, 2006, pp. 1-3. XP003022047 sections 1-4 figures 2-1,3-1.
3rd Generation Partnership Project (3GPP) Technical Specification TS 36.211 (Mar. 2007)'Physical Channels and Modulation', version 1.0.0 of Mar. 19, 2007.) Release 8. English Translation of Japanese Office Action mailed Jan. 20, 2012 issued in corresponding Japanese Patent Application No. 2010-504662.
Federal Service for Intellectual Property, Patents and Trade Marks (Rospatent), Decision to Grant a Patent for an Invention, dated Nov. 13, 2012, from Russian Patent Application No. 2009144109/07.
English language translation of Notification of Reasons for Refusal dated Nov. 26, 2012, from Japanese Patent Application No. 2010-504662, 6 pages.

* cited by examiner

*Primary Examiner* — Steven H Nguyen
(74) *Attorney, Agent, or Firm* — Staas & Halsey LLP

(57) ABSTRACT

A modulator and a modulation method for a communication device are disclosed. The modulator is configured to multiplex control symbols and data symbols for transmission in a signal based on information of the distance between the positions of at least two control symbols in a representation of symbol positions in the signal.

29 Claims, 4 Drawing Sheets

| $b(n),b(n+1)$ | I | Q |
|---|---|---|
| 00 | $-7/\sqrt{42}$ | $-7/\sqrt{42}$ |
| 01 | $-7/\sqrt{42}$ | $7/\sqrt{42}$ |
| 10 | $7/\sqrt{42}$ | $-7/\sqrt{42}$ |
| 11 | $7/\sqrt{42}$ | $7/\sqrt{42}$ |

Table 3

| | QPSK | | 16 QAM | | 64 QAM | |
|---|---|---|---|---|---|---|
| | I | Q | I | Q | I | Q |
| ACK | $1/\sqrt{2}$ | $1/\sqrt{2}$ | $3/\sqrt{10}$ | $3/\sqrt{10}$ | $7/\sqrt{42}$ | $7/\sqrt{42}$ |
| NACK | $-1/\sqrt{2}$ | $-1/\sqrt{2}$ | $-3/\sqrt{10}$ | $-3/\sqrt{10}$ | $-7/\sqrt{42}$ | $-7/\sqrt{42}$ |

Table 1

| $b(n), b(n+1)$ | $I$ | $Q$ |
|---|---|---|
| 00 | $-3/\sqrt{10}$ | $-3/\sqrt{10}$ |
| 01 | $-3/\sqrt{10}$ | $3/\sqrt{10}$ |
| 10 | $3/\sqrt{10}$ | $-3/\sqrt{10}$ |
| 11 | $3/\sqrt{10}$ | $3/\sqrt{10}$ |

<u>Table 2</u>

DATA MODULATION IN A COMMUNICATION SYSTEM

CROSS REFERENCE TO RELATED APPLICATIONS

This application is based on and hereby claims priority to PCT Application No. PCT/EP2008/054860 filed on Apr. 22, 2008 and GB Application No. 0708344.7 filed on Apr. 30, 2007, the contents of which are hereby incorporated by reference.

BACKGROUND OF THE INVENTION

The present invention relates to communication of data and in particular to modulation of data transmitted between two entities of a communication system.

A communication system is a facility which facilitates communication between two or more entities such as communication devices, network entities and other nodes. A communication system may be provided by one more interconnect networks. It is noted that although a communication system typically comprises at least one communication network, for example a fixed line network or a wireless or mobile network, in its simplest form a communication system is provided by two entities communicating with each other. The communication may comprise, for example, communication of data for carrying communications such as voice, electronic mail (email), text message, multimedia and so on.

A user may communicate by an appropriate communication device. An appropriate access system allows the communication device to access to a communication system. An access to the communications system may be provided by a fixed line or wireless communication interface, or a combination of these. Examples of wireless access systems include cellular access networks, various wireless local area networks (WLANs), wireless personal area networks (WPANs), satellite based communication systems and various combinations of these.

A communication system typically operates in accordance with a standard and/or a set of specifications and protocols which set out what the various elements of the system are permitted to do and how that should be achieved. For example, it is typically defined if the user, or more precisely user device, is provided with a circuit switched bearer or a packet switched bearer, or both. Also, the manner in which communication and various aspects thereof should be implemented between the user device and the various elements of the communication and their functions and responsibilities are typically defined by a predefined communication protocol.

In a radio or wireless system an entity in the form of a base station provides a node for communication with user communication devices, often referred to as mobile stations. Communications in the direction from the base station to the user device is seen as occurring on a "downlink" (DL). Communications in the direction from the user device to the base station is then seen as occurring on an "uplink" (UL). It is noted that in certain systems a base station is called 'Node B'.

Signalling between various entities may be divided between signalling of control data and actual data. The latter refers to the data content the users wish to communicate. Control signalling, in turn, associates to transfer of information that is not related as such to the data content the users may wish to be transferred. In the following these two forms of signalling are separated by referring to control signalling and data signalling, where appropriate.

To ensure proper operation of the system, the control signalling typically has higher quality requirements than the data signalling. On the other hand, the amount of information conveyed by control signalling such as by acknowledgement signalling is typically only one or two bits. This is less than what can be carried by data modulated symbols, for example Quadrature amplitude modulated (QAM) symbols. For example 16QAM carries 4 bits and 64 QAM carries 6 bits.

An example of control signalling is the transfer of positive and negative acknowledgement information signalling, often referred to as ACK/NACK signalling. The acknowledgement signalling is used to provide feedback concerning previous transmissions, for example if a previous data transmission such as a data packet is properly received.

Despite the advantages in signalling technologies, there is still need to optimize the performance of communications between two devices, for example though reduction of errors in control signalling. Use of a single modulation method for control signalling and data signalling might be desired in various applications.

The herein described embodiments aim to address one or several of the above mentioned shortcomings and/or desires.

SUMMARY

According to an embodiment of the inventors' proposal, there is provided a modulator for a communication device, the modulator being configured to multiplex control symbols and data symbols for transmission in a signal based on information of the distance between the positions of at least two control symbols in a representation of symbol positions in the signal.

In accordance with another embodiment there is provided a modulation method, comprising multiplexing control symbols with data symbols for transmission in a signal based on information of the distance between positions of at least two control symbols in a representation of symbol positions in the signal.

In accordance with yet another embodiment there is provided a communication system comprising a first communication device and a second communication device, wherein at least one of the devices is configured to multiplex control symbols and data symbols for transmission in a signal to the other device based on information of the distance between the positions of at least two control symbols in a representation of symbol positions in the signal receiving a transmission by a first communication device from a second communication device.

In accordance with a more specific embodiment, the control symbols are multiplexed based on at least one Euclidean distance. At least two control symbols may be mapped into positions that have the largest distance between them or that are otherwise located at least a predetermined length apart from each other.

Information about the power on at least one position in the representation may also be utilised. Positions with the highest power may be selected for use by control symbols. According to an embodiment, positions with a power that exceeds a predefined power threshold are selected for use by the control symbols.

The control symbols may comprise an acknowledgement by a first communication device of a transmission from a second communication device, wherein the acknowledgement is multiplexed with the data symbols into a signal for transmission from the first communication device. The acknowledgement may comprise ACK/NACK symbols.

The representation may comprise a constellation diagram. The modulation may comprise at least one of quadrature amplitude modulation and phase shift keying.

The computations may be provided by a computer program comprising program code adapted to perform the necessary steps when the program is run on a processor. The processor may be for a station of a communication system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
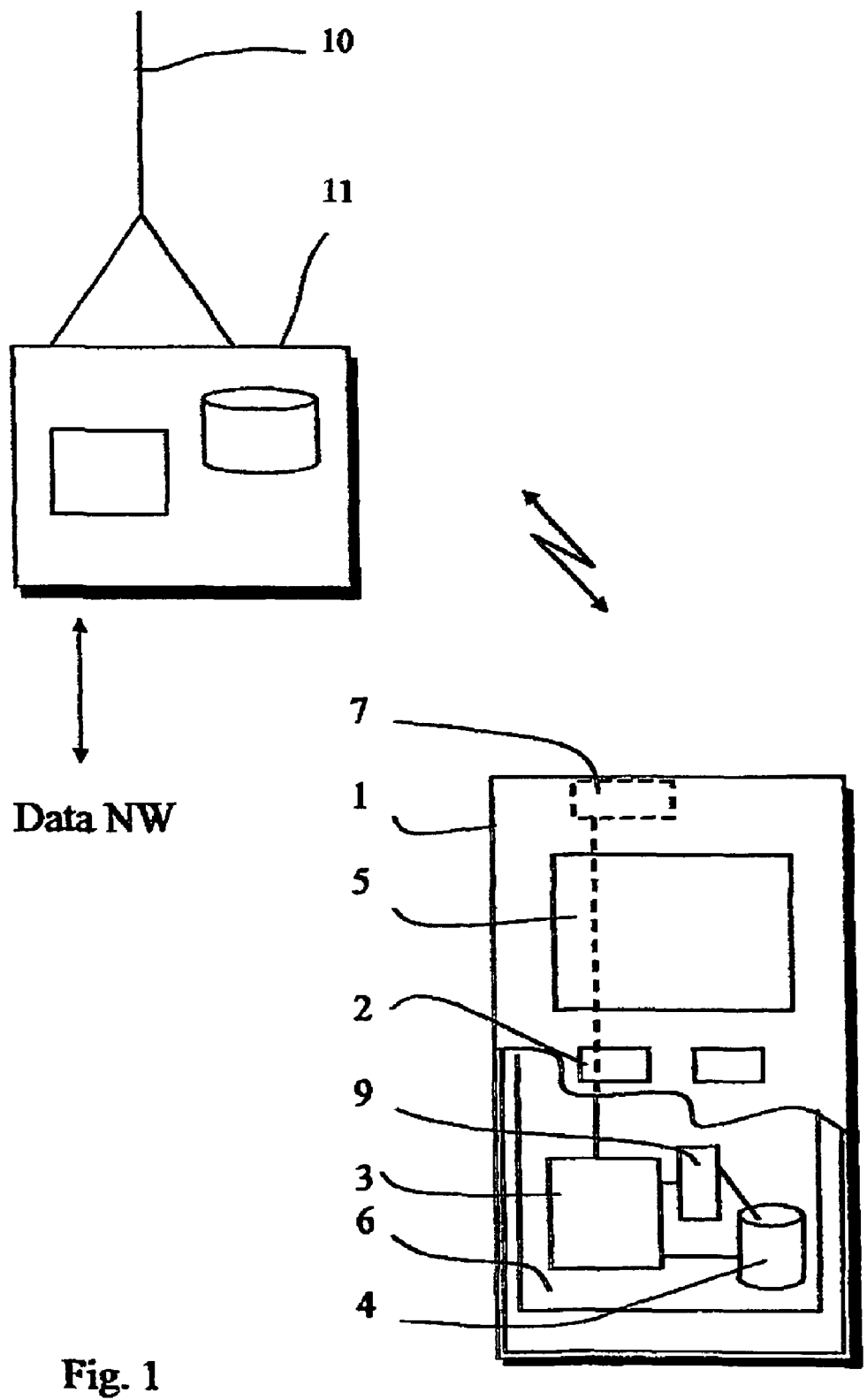
FIG. 1 shows a schematic presentation of a communication system wherein the inventors' proposal may be embodied.

Reference will now be made in detail to the preferred embodiments of the present invention, examples of which are illustrated in the accompanying drawings, wherein like reference numerals refer to like elements throughout.

Before explaining in detail a few exemplifying embodiments, a brief explanation of certain general principles of wireless communications in a system comprising a base station and a communication device such as a mobile station is given with reference to FIG. 1.

A communication device, for example a user device, can be used for accessing various services and/or applications provided via a communications system. In wireless or mobile systems the access is provided via an access interface between a user device 1 and an appropriate wireless access system. The user device can typically access wirelessly a communication system via at least one base station 10 or similar wireless transmitter and/or receiver node. Non-limiting examples of access nodes are a base station of a cellular system and a base station of a wireless local area network (WLAN). Each user device may have one or more radio channels open at the same time and may be connected to more than one base station.

The base station may be connected to other systems, for example a data network. A gateway function between a base station node and another network may be provided by any appropriate gateway node, for example a packet data gateway and/or an access gateway.

A base station is typically controlled by at least one appropriate controller entity. The controller entity can be provided for managing of the overall operation of the base station and communications via the base station. The controller entity is typically provided with memory capacity and at least one data processor. Functional entities may be provided in the controller by the data processing capability thereof. The functional entities provided in the base station controller may provide functions relating to radio resource control, access control, packet data context control and so forth.

Certain embodiments can be used, for example, for the uplink (UL) part of a long term evolution (LTE) radio system for transmission of downlink (DL) ACK/NACK with UL data. Therefore the non-limiting example of FIG. 1 shows the concept of what is known as the long term evolution (LTE). This system provides an evolved radio access system that is connected to a packet data system. Such an access system may be provided, for example, based on architecture that is known from the Evolved Universal Terrestrial Radio Access (E-UTRA) and based on use of the Evolved Universal Terrestrial Radio Access Networks (E-UTRAN) Node Bs (eNBs). An Evolved Universal Terrestrial Radio Access Network (E-UTRAN) includes of E-UTRAN Node Bs (eNBs) which are configured to provide base station and control functionalities. For example, the eNBs nodes can provide independently radio access network features such as user plane radio link control/medium access control/physical layer protocol (RLC/MAC/PHY) and control plane radio resource control (RRC) protocol terminations towards the user devices.

It is noted that FIG. 1 shows this architecture only to give an example of a possible communication system where the embodiments described below may be provided and that other arrangements and architectures are also possible. For example, the user device may communicate with a different access system.

The user device 1 can be used for various tasks such as making and receiving phone calls, for receiving and sending data from and to a data network and for experiencing, for example, multimedia or other content. For example, a user device may access data applications provided via a data network. For example, various applications may be offered in a data network that is based on the Internet Protocol (IP) or any other appropriate protocol. An appropriate user device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like.

The mobile device may communicate via an appropriate radio interface arrangement of the mobile device. The interface arrangement may be provided for example by a radio part 7 and associated antenna arrangement. The antenna arrangement may be arranged internally or externally to the mobile device.

A mobile device is typically provided with at least one data processing entity 3 and at least one memory 4 for use in tasks it is designed to perform. The data processing and storage entities can be provided on an appropriate circuit board and/or in chipsets. This feature is denoted by reference 6.

FIG. 1 shows further a modulator component 9 connected to the other elements. Examples for modulation functions thereof are described later in this specification. It is noted that the modulator functions may be arranged to be provided by the data processing entity 3 instead of a separate component.

The user may control the operation of the mobile device by a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

The following discusses embodiments an acknowledgement of transmission in one direction and data sent in another direction are multiplexed in a symbol level, and more particularly, certain embodiments where downlink ACK/NACK and uplink data are time-multiplexed in the symbol level. In the following examples downlink ACK/NACK signalling is modulated for transmission with uplink data from a mobile station to a base station. It is noted that instead of a base station, the communication can be sent e.g. to another mobile station and that the modulation may also take place in a base station.

An exemplifying embodiment of the method is now described with reference to the flowchart of FIG. 2. In this embodiment control symbols are multiplexed at 102 with data symbols based on information of the distance between positions of at least two control symbols in a representation of symbol positions in the signal, as determined at step 100. The multiplexed symbols can then be transmitted at 104.

In accordance with a more specific embodiment a particular ACK/NACK bit mapping rule is used when ACK/NACK symbols are multiplexed with data symbols at 102. The multiplexing may be based on time multiplexing.

The symbols can be mapped into a signal space diagram to illustrate ideal positions of symbols in a signal. An example of such representation of a signal is a constellation diagram, or simply constellation. A constellation diagram is an example of the possibilities to visualise symbol positions in a signal, and the basis thereof that a transmitted symbol can be represented as a complex number. The symbols are represented as complex numbers and can thus be visualized as points on the complex plane.

A constellation diagram can be used to provide a representation of a signal modulated by a digital modulation scheme such as the quadrature amplitude modulation (QAM) or a phase-shift keying (PSK). Quadrature (Q) carriers cam be provided by modulating a cosine and sine carrier signal with the real and imaginary parts of the complex number, respectively, the symbol can be sent with two carriers on a single frequency. The real and imaginary axes are often called the in phase, or I-axis and the quadrature, or Q-axis.

Figures 3, 4:
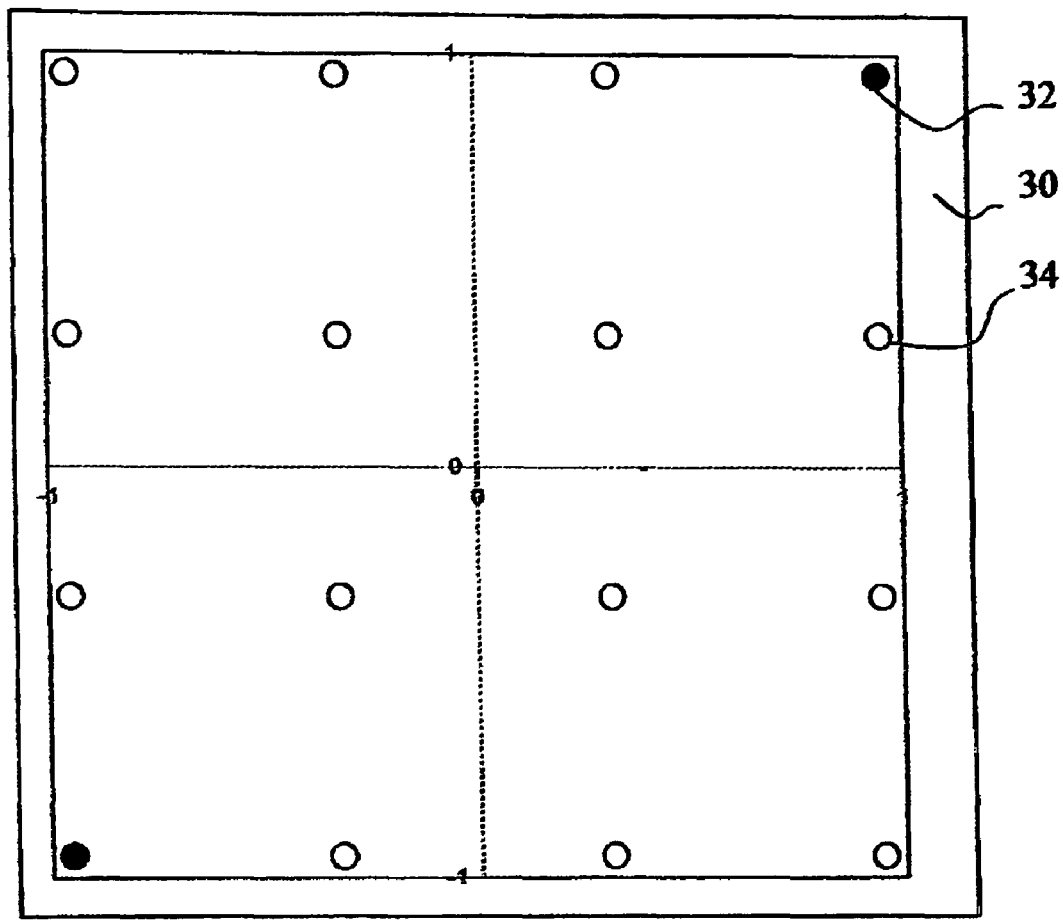
FIG. 3 shows a mapping scheme.
FIG. 4 shows a table of values associated with the FIG. 3 example.
Figures 5, 6:
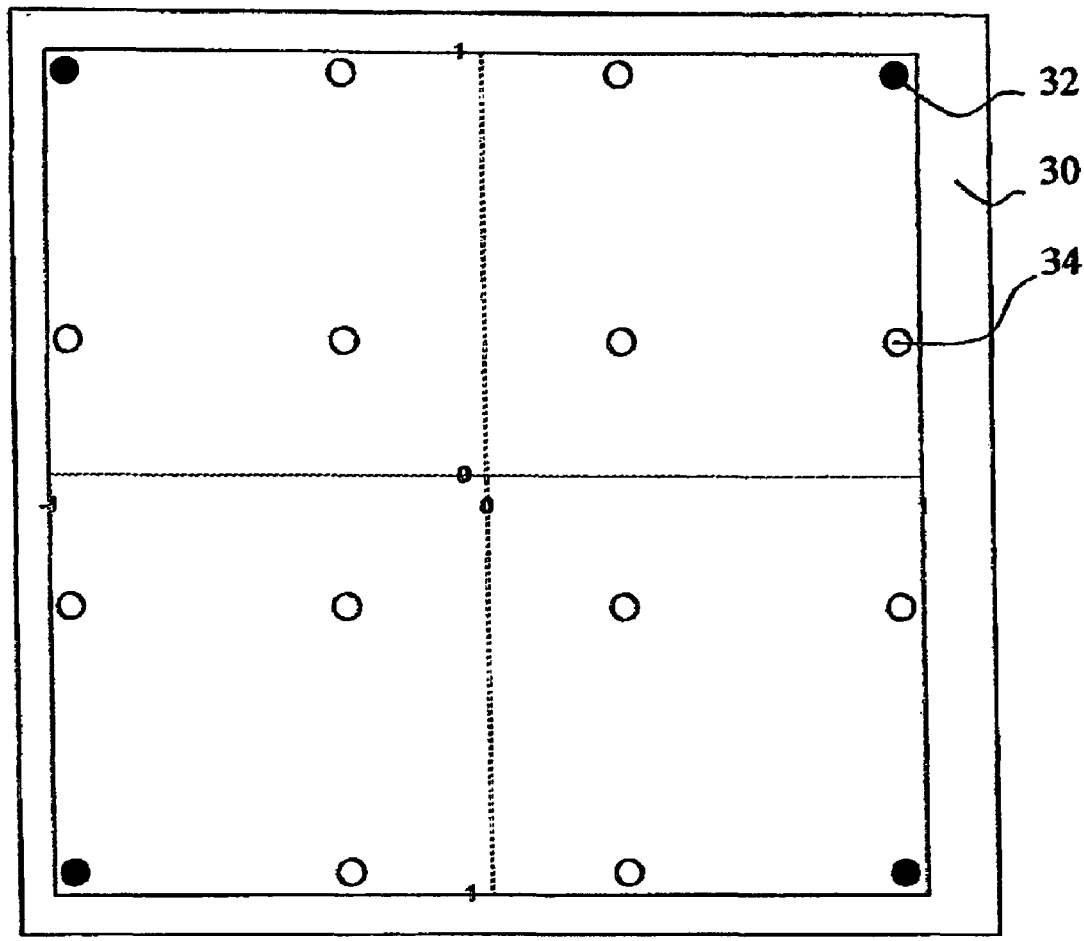
FIG. 5 shows another mapping scheme.

The constellation diagram can be used for displaying a signal as a two-dimensional diagram in a complex plane at symbol sampling instants, or points. The constellation diagram can thus be used to provide a representation of the position of the symbols in the modulation scheme, and allows for a straightforward visualization of the modulation process. Examples of rectangular 16 QAM constellation diagrams 30 are shown in FIGS. 3 and 5.

ACK/NACK symbols to be transmitted can be mapped into same constellation diagram that is used by the data symbols. In accordance with an embodiment constellation points having the largest Euclidean distance can be selected for ACK/NACK transmission. The Euclidean distance is commonly understood as being the distance between two points represented as the root of the square of difference between co-ordinates of a pair of objects. The Euclidean distance can be computed as $$\sqrt{(I_k-I_l)^2+(Q_k-Q_l)^2}$$

where k=[1, 2 . . . m], l=[1, 2 . . . m] presents the indexes of modulation constellations used for data symbols, and m is number of constellations used for data symbols.

Another possibility is to use a predefined threshold for the distance. For example, any points with a Euclidean distance that is larger than a predefined threshold can be selected. In accordance with a yet another embodiment the selection rule allows selection amongst constellation points that provide the most promising candidates, for example, 2 or 3 largest Euclidean distances, or any other predefined number of largest Euclidean distances.

In accordance with a further embodiment the power levels of the constellations points are also taken into consideration in the selection process. For example, the points that have the largest Euclidean distance or large enough Euclidean distance and a high enough power are selected. Thus a point with a large enough distance but too low power may not be selected. An optimised combination of distance thresholds and power thresholds may be employed. In some applications it may be desirable to select the points with the highest power levels even if they are not the points with the largest distances.

FIG. 3 shows an example of one-bit ACK/NACK mapping into a constellation diagram 30. More particularly, in this specific example a 16 quadrature amplitude modulation (QAM) scheme is used for data symbols. The black dots 32 denote the proposed constellation points for ACK/NACK transmission. The White dots 34 are then left for data. More detailed examples of possible mapping rules considering also 64 QAM modulation, and two-bit ACK/NACK transmission are considered below.

Table 1 shown in FIG. 4 is an example for constellation mapping of ACK/NACK signalling into complex-valued modulated symbols, x=I+jQ, with different data modulation schemes. More particularly, in the examples shown in Table 1 one-bit ACK/NACK symbols are mapped with data modulations QPSK, 16QAM and 64 QAM. The complex-values of this example are based on $3^{rd}$ Generation Partnership Project (3GPP) Technical Specification TS 36.211 'Physical Channels and Modulation', version 1.0.0 of 19 Mar. 2007.

FIG. 5 shows mapping of a two-bits ACK/NACK signalling into a constellation diagram 30. Two-bits ACK/NACK signalling may be needed e.g., when dual-codeword Multiple-Input Multiple-Output (MIMO) transmission is used in the downlink.

Figures 2, 7:
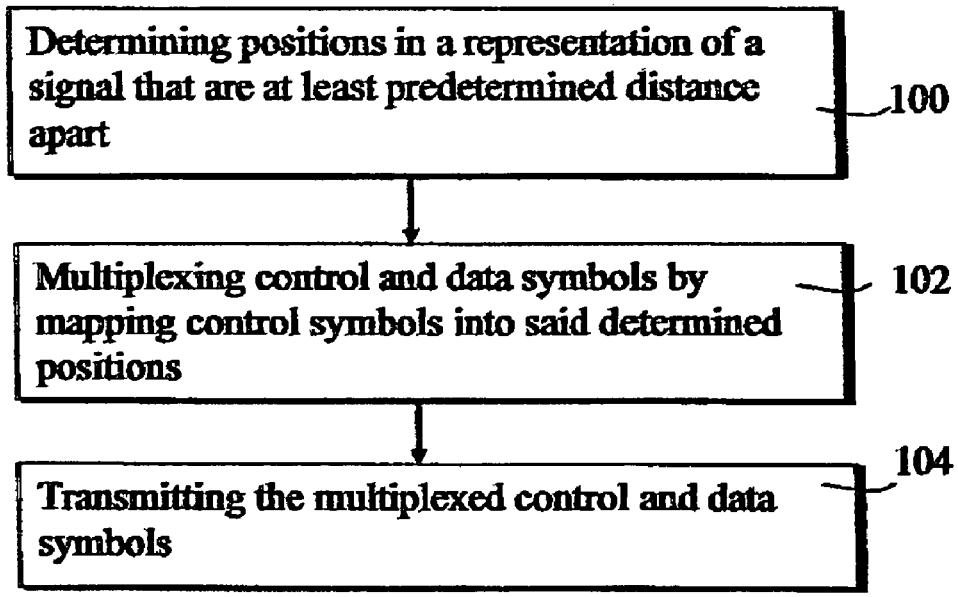
FIG. 2 shows a flowchart in accordance with an embodiment.
FIGS. 6 and 7 shows tables of values associated with the FIG. 5 example.

An example for constellation mapping of two-bit ACK/NACK signalling with 16 QAM modulation is shown in Table 2 and for 64 QAM is shown in Table 3, see FIGS. 6 and 7, respectively. In 16 QAM modulation a pair of ACK/NACK signalling bits is mapped into complex-valued modulation symbols, x=I+jQ, according to Table 2. In 64 QAM modulation, pair of the bits is mapped into complex-valued modulation symbols, x=I+jQ, according to Table 3.

The required data processing functions for the modulation and/or the related decision making may be provided by one or more data processors. Data processing may be provided in a processing unit or module of a station, for example a user device or a base station. The above described functions may be provided by separate processors or by an integrated processor. An appropriately adapted computer program code product or products may be used for implementing the embodiments, when loaded on an appropriate processor, for example in a processor of a base station controller or a controller of a user device. The program code may, for example, perform the generation and/or interpretation of information signalled between the various entities and control various operations. The program code product for providing the operation may be stored on and provided by a carrier medium such as a carrier disc, card or tape. A possibility is to download the program code product to the mobile device via a data network.

An advantage of the above described examples of mapping ACK/NACK symbols, or other control signalling symbols, into the data symbols in a constellation is that optimized performance can be obtained. This is because the control symbol signals can be provided to have the maximum Euclidean distance or a predefined Euclidean distance between each other, thereby reducing the risk for errors. The quality of control signalling can be improved. Use of the constellation points from the same constellation diagram for control and payload data in modulation is enabled. If maximum power or large enough power is used for signalling control symbols maximized Signal-to-Noise Ratio (SNR) without any significant effect to Peak-to-Average Ratio (PAR) can be achieved.

It is noted that whilst embodiments have been described in relation to modulation in user devices such as mobile stations and network devices such as base stations, embodiments of the present invention are applicable to any other type of apparatus suitable for data communication where modulation may be needed. Similar principles may be applied to any communication technologies where modulation of control and data symbols can be utilised.

It is also noted that although certain embodiments were described above by way of example with reference to certain exemplifying architectures for wireless networks, technologies and standards, embodiments may be applied to any other suitable forms of communication systems than those illustrated and described herein. It is also noted that the term access system is understood to refer to any access system configured for enabling wireless communication for user accessing applications.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A modulator for a communication device, the modulator comprising:
    a mapping unit mapping control symbols and data symbols into a representation of positions of the symbols in a signal; and
    a multiplexer multiplexing the control symbols and the data symbols for transmission in an output signal based on information regarding a distance between the positions of at least two of the control symbols in the representation,
    wherein the multiplexer multiplexes the control symbols and the data symbols using information regarding at least one Euclidean distance between positions of at least two of the control symbols.

2. The modulator as claimed in claim 1, wherein the modulator maps at least two control symbols into positions that have the largest distance between each other.

3. The modulator as claimed in claim 1, wherein the modulator maps at least two control symbols into positions that are located at least a predetermined length apart from each other.

4. The modulator as claimed in claim 1, wherein the control symbols include an acknowledgement by a first communication device of a transmission from a second communication device, the modulator multiplexing the acknowledgement with the data symbols for transmission from the first communication device in the signal.

5. The modulator as claimed in claim 1, wherein the modulator time multiplexes the symbols.

6. The modulator as claimed in claim 1, wherein the modulator multiplexes downlink ACK/NACK symbols with uplink data symbols.

7. The modulator as claimed in claim 1, wherein the representation comprises a constellation diagram.

8. The modulator as claimed in claim 1, wherein the modulator is configured for at least one of quadrature amplitude modulation and phase shift keying.

9. The modulator as claimed in claim 1, wherein at least one of the positions of the control symbols include a complex value and a real value.

10. A modulator for a communication device, the modulator comprising:
    a mapping unit mapping control symbols and data symbols into a representation of positions of the symbols in a signal; and
    a multiplexer multiplexing the control symbols and the data symbols for transmission in an output signal based on information regarding a distance between the positions of at least two of the control symbols in the representation,
    wherein information about a power level at at least one position in the representation is further used in the multiplexing.

11. The modulator as claimed in claim 10, wherein the modulator selects positions with the highest power level for the control symbols.

12. The modulator as claimed in claim 10, wherein the modulator selects positions with a power level that exceeds a predefined power level threshold for the control symbols.

13. A station for a communication system, comprising:
    a modulator mapping control symbols and data symbols into a representation of positions of the symbols in a signal and multiplexing the control symbols and the data symbols for transmission in an output signal based on information regarding a distance between the positions of at least two of the control symbols in the representation,
    wherein the modulator multiplexes the control symbols and the data symbols using information regarding at least one Euclidean distance between positions of at least two of the control symbols.

14. The station as claimed in claim 13, wherein the station comprises one of a user device and a base station.

15. The station as claimed in claim 13, wherein the station is configured for Evolved Universal Terrestrial Radio Access (E-UTRA).

16. A modulation method, comprising:
    mapping control symbols and data symbols into a representation of positions of the symbols in a signal; and
    multiplexing the control symbols with the data symbols for transmission in an output signal based on information regarding a distance between the positions of at least two of the control symbols in the representation,
    wherein the multiplexing further comprises using information regarding at least one Euclidean distance between positions of at least two of the control symbols.

17. The method as claimed in claim 16, further comprising mapping at least two control symbols into positions that have the largest distance between each other.

18. The method as claimed in claim 16, further comprising mapping at least two control symbols into positions that are located at least a predetermined length apart from each other.

19. The method as claimed in claim 16, comprising
    receiving a transmission at a first communication device from a second communication device; and
    multiplexing symbols representing an acknowledgement of the transmission at the first communication device with the data symbols in the signal for transmission of data from the first communication device to the second communication device.

20. The method as claimed in claim 16, wherein the symbols are time multiplexed.

21. The method as claimed in claim 16, wherein downlink ACK/NACK symbols are multiplexed with uplink data symbols.

22. The method as claimed in claim 16, wherein at least one of the positions of the control symbols include a complex value and a real value.

23. A modulation method comprising:
   mapping control symbols and data symbols into a representation of positions of the symbols in a signal; and
   multiplexing the control symbols with the data symbols for transmission in an output signal based on information regarding a distance between the positions of at least two of the control symbols in the representation,
   wherein information about a power level at at least one position in the representation is used in the multiplexing.

24. The method as claimed in claim 23, further comprising selecting positions with the highest power level for the control symbols.

25. The method as claimed in claim 23, further comprising selecting positions with a power level that exceeds a predefined power level threshold for the control symbols.

26. A computer program stored on a non-transitory computer readable medium, comprising program code means adapted to perform a method when the program is run on a processor, the method comprising:
   mapping control symbols and data symbols into a representation of positions of the symbols in a signal; and
   multiplexing the control symbols with the data symbols for transmission in an output signal based on information regarding a distance between the positions of at least two of the control symbols in the representation,
   wherein the multiplexing further comprises using information regarding at least one Euclidean distance between positions of at least two of the control symbols.

27. The computer program as claimed in claim 26, wherein the processor is for a station of a communication system.

28. A communication system, comprising:
   a first communication device; and
   a second communication device,
   wherein at least one of the devices receiving a transmission from another of the devices is configured to map control symbols and data symbols into a representation of positions of the symbols in a signal and to multiplex the control symbols and the data symbols for transmission in an output signal to one of the other devices based on information regarding a distance between the positions of at least two of the control symbols in the representation,
   wherein the at least one of the device multiplexes the control symbols and the data symbols using information regarding at least one Euclidean distance between positions of at least two of the control symbols.

29. The communication system as claimed in claim 28, wherein the control symbols represent an acknowledgement by the first communication device of a transmission by the second communication device, the control symbols being multiplexed with the data symbols in a signal for transmission of data from the first communication device to the second communication device.

* * * * *